US011872185B2

(12) United States Patent
Kang et al.

(10) Patent No.: US 11,872,185 B2
(45) Date of Patent: Jan. 16, 2024

(54) MASSAGE DEVICE HAVING SOUND OUTPUT MODULE AND CONTROL METHOD THEREOF

(71) Applicant: BODYFRIEND CO., LTD., Seoul (KR)

(72) Inventors: Woong Chul Kang, Gyeonggi-do (KR); Ju Song Hur, Incheon (KR); Ho Soo Kim, Seoul (KR)

(73) Assignee: BODYFRIEND CO., LTD., Seoul (KR)

( * ) Notice: Subject to any disclaimer, the term of this patent is extended or adjusted under 35 U.S.C. 154(b) by 631 days.

(21) Appl. No.: 17/047,362

(22) PCT Filed: Apr. 12, 2019

(86) PCT No.: PCT/KR2019/004429
§ 371 (c)(1),
(2) Date: Oct. 13, 2020

(87) PCT Pub. No.: WO2019/199110
PCT Pub. Date: Oct. 17, 2019

(65) Prior Publication Data

US 2021/0113431 A1 Apr. 22, 2021

(30) Foreign Application Priority Data

Apr. 13, 2018 (KR) ........................ 10-2018-0043095
Apr. 13, 2018 (KR) ........................ 10-2018-0043122
Apr. 13, 2018 (KR) ........................ 10-2018-0043123

(51) Int. Cl.
*A61H 37/00* (2006.01)
*A61H 15/00* (2006.01)

(52) U.S. Cl.
CPC ......... *A61H 37/00* (2013.01); *A61H 15/0078* (2013.01); *A61H 2201/0149* (2013.01); *A61H 2201/123* (2013.01); *A61H 2201/5048* (2013.01)

(58) Field of Classification Search
CPC ................ A61H 37/00; A61H 15/0078; A61H 2201/0149; A61H 2201/123;
(Continued)

(56) References Cited

U.S. PATENT DOCUMENTS 10,200,781 B2 2/2019 Yoo et al.
2008/0199037 A1* 8/2008 Xu ........................ H04R 1/345 381/387

(Continued)

FOREIGN PATENT DOCUMENTS

CN 1810234 A 8/2006
CN 201235074 Y 5/2009

(Continued)

*Primary Examiner* — Justine R Yu
*Assistant Examiner* — Matthew R Moon
(74) *Attorney, Agent, or Firm* — Bridgeway IP Law Group, PLLC; Sang Ho Lee; Hyun Woo Shin

(57) ABSTRACT

Provided herein is a massage device having a sound output module. According to an embodiment of the present disclosure, there is provided a sound output module including a sound generating part configured to generate sound, a sound emitting member configured to emit transmitted sound to the outside, an actuator configured to provide a driving force to allow movement of the sound emitting member, and an external driven member configured to receive the driving force from the actuator and move linearly, wherein the sound emitting member is seated on the external driven member and allowed to protrude outward due to linear movement of the external driven member. There is also provided a massage device including the sound output module.

11 Claims, 8 Drawing Sheets

(58) Field of Classification Search
CPC .... A61H 2201/5048; A61H 2201/1633; A61H 2201/1604; A61H 2201/1623; A61H 2201/164; A61H 2201/1635; A61H 2201/169; A61H 9/0078; A61H 2201/5043; A61H 2203/0431; A61H 2205/081; A61H 2205/086; A61H 2201/5071; A61H 2205/06; A61H 2205/10; A61H 1/00
See application file for complete search history.

(56) References Cited

U.S. PATENT DOCUMENTS

| | | | | |
|---|---|---|---|---|
| 2014/0219492 | A1* | 8/2014 | Pelliccio ................ | H04R 5/023 381/389 |
| 2017/0189557 | A1* | 7/2017 | Park ..................... | C12N 5/0068 |

FOREIGN PATENT DOCUMENTS

| | | | |
|---|---|---|---|
| CN | 206777496 | U | 12/2017 |
| EP | 0416049 | * | 3/1991 |
| JP | 2002-301128 | A | 10/2002 |
| JP | 2003-135210 | A | 5/2003 |
| KR | 10-2000-0044261 | A | 7/2000 |
| KR | 10-0850983 | B1 | 8/2008 |
| KR | 10-2017-0028292 | A | 3/2017 |

* cited by examiner

MASSAGE DEVICE HAVING SOUND OUTPUT MODULE AND CONTROL METHOD THEREOF

TECHNICAL FIELD

The present invention relates to a massage device including a sound output module, and a user terminal.

BACKGROUND ART

Massage is an adjuvant therapy in which dynamic stimuli in various forms are applied to a part of a subject's body by rubbing, pressing, pulling, tapping, or moving the part of the body to adjust modulation of the subject's body, aid circulation, and relieve the subject's fatigue.

For economic and time reasons, an increase in demand for massage has caused an increase in demand for massage apparatuses or massage devices that provide artificial massage functions. That is, with an increase in demand to relieve fatigue or stress by relaxing tight muscles through massage, various massage devices which are efficient in terms of time and cost have been launched. Tools, devices, or apparatuses in any form that perform massage through mechanical devices without a massager are referred to as massage devices.

In recent years, beyond simply providing a massage function, massage devices have been transformed into electronic devices that perform various additional functions and/or medical functions.

Accordingly, research on a massage device having a sound output module has been continuously carried out.

DISCLOSURE

Technical Problem

The present disclosure is directed to providing a massage device having a sound output module.

The present disclosure is also directed to providing a massage device in which at least some of the elements of the sound output module protrude outward.

Technical Solution

An embodiment of the present disclosure provides a sound output module including a sound generating part configured to generate sound, a sound emitting member configured to emit transmitted sound to the outside, an actuator configured to provide a driving force to allow movement of the sound emitting member, and an external driven member configured to receive the driving force from the actuator and move linearly, wherein the sound emitting member is seated on the external driven member and allowed to protrude due to linear movement of the external driven member.

Another embodiment of the present disclosure provides a massage device including a main frame constituting a framework of the massage device, a body massage module coming in contact with the main frame and configured to provide dynamic stimuli to a user, and a sound output module configured to output sound to the user, wherein the sound output module includes a sound generating part configured to generate sound, a sound emitting member configured to emit transmitted sound to the outside, an actuator configured to provide a driving force to allow movement of the sound emitting member, and an external driven member configured to receive the driving force from the actuator and move linearly, wherein the sound emitting member is seated on the external driven member and allowed to protrude due to linear movement of the external driven member.

DESCRIPTION OF DRAWINGS

Various aspects will be described below with reference to the drawings. Here, similar reference numerals will be used to refer to substantially similar elements. In the following embodiments, for the sake of description, a plurality of specific details will be proposed to provide overall understanding of one or more aspects. However, it is apparent that the aspect(s) may be embodied without the specific details. In other examples, known structures and devices are illustrated as block diagrams to facilitate description of one or more aspects.

BEST MODE OF THE INVENTION

Figure 1:
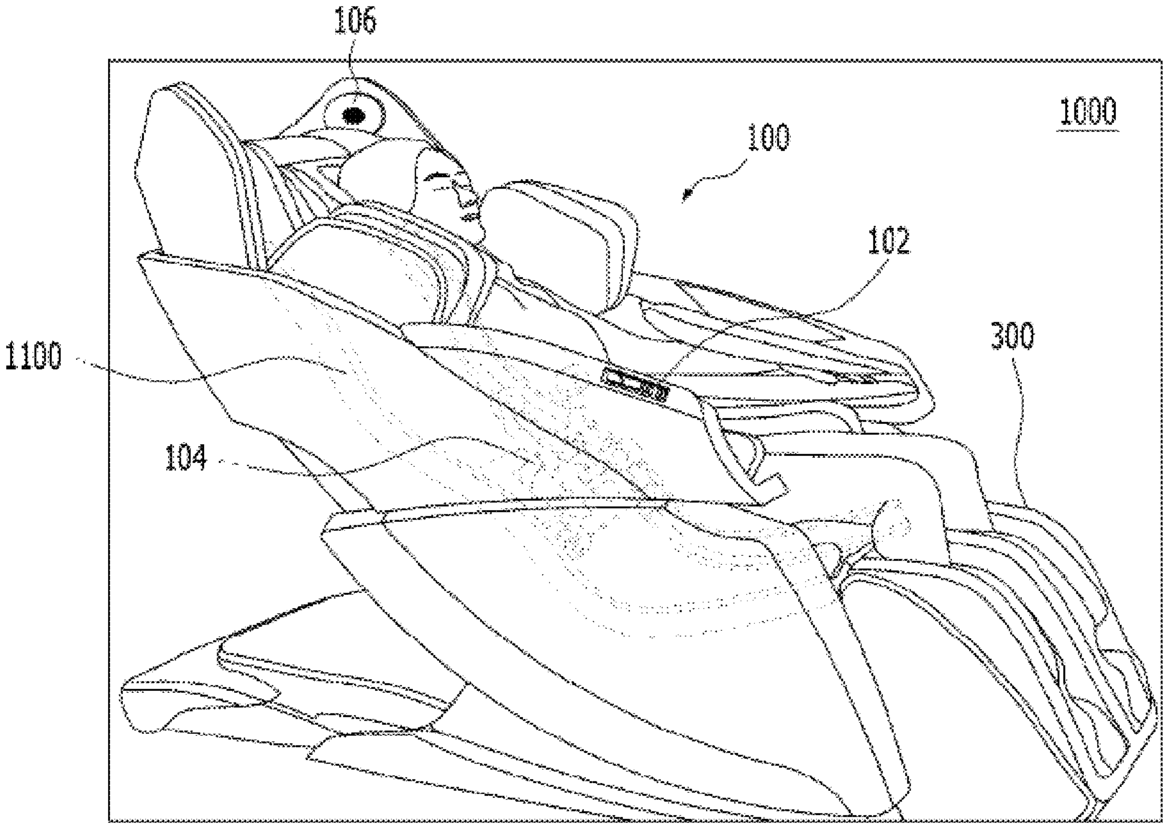
FIG. 1 is a view for describing a massage device (1000) according to an embodiment of the present invention.

A sound output module including a sound generating part configured to generate sound, a sound emitting member configured to emit the generated sound to the outside, an actuator configured to provide a driving force to allow movement of the sound emitting member, and an external driven member configured to receive the driving force from the actuator and move linearly, wherein the sound emitting member is seated on the external driven member and allowed to protrude due to linear movement of the external driven member.

[Modes of the Invention]

The objects, features, and advantages of the present disclosure described above will become more apparent through the following embodiments relating to the accompanying drawings. The following descriptions of specific structures or functions are only given to describe embodiments according to the concept of the present disclosure. The embodiments according to the concept of the present disclosure may be embodied in various forms, and the present disclosure should not be interpreted as being limited by the embodiments described in the present specification or application.

Since the embodiments according to the concept of the present disclosure may be changed in various ways and have various forms, specific embodiments are illustrated in the drawings and will be described in detail in the present specification or application. However, this does not limit the embodiments according to the concept of the present disclosure to specific disclosed forms, and all changes, equivalents, and substitutes included in the idea and technical scope of the present disclosure should be construed as belonging to the embodiments according to the concept of the present disclosure.

Terms such as first and/or second may be used to describe various elements, but the elements are not limited by the terms. The terms are only used for the purpose of distinguishing one element from another element. For example, without departing from the scope according to the concept of the present disclosure, a first element may be referred to as a second element and, likewise, a second element may also be referred to as a first element.

When it is mentioned that a certain element is "connected" or "linked" to another element, although the certain element may be directly connected or linked to the other element, it should be understood that another element may be present therebetween. On the other hand, when it is mentioned that a certain element is "directly connected" or "directly linked" to another element, it should be understood that another element is not present therebetween. Other expressions used to describe a relationship between elements, i.e., "between" and "directly between" or "adjacent" and "directly adjacent," should be interpreted likewise.

Terms used in the present specification are only used to describe specific embodiments and are not intended to limit the present disclosure. A singular expression includes a plural expression unless the context clearly indicates otherwise. In the specification, terms such as "include" or "have" should be understood as designating that features, number, steps, operations, elements, parts, or combinations thereof exist and not as precluding the existence of or the possibility of adding one or more other features, numbers, steps, operations, elements, parts, or combinations thereof in advance.

Unless otherwise defined, all terms including technical or scientific terms used herein have the same meaning as commonly understood by those of ordinary skill in the art to which the present disclosure pertains. Terms, such as those defined in commonly used dictionaries, should be construed as having a meaning that is consistent with their meaning in the context of the relevant art and are not to be construed in an idealized or overly formal sense unless expressly so defined herein.

In the present specification, an actuator refers to an element capable of providing a driving force. Examples of the actuator may include a motor, a linear motor, an electronic motor, a DC motor, an AC motor, a linear actuator, an electric actuator, and the like, but the present disclosure is not limited thereto.

In the present specification, a user terminal (not illustrated) refers to an electronic device that may be connected to a massage device 1000 through wired or wireless communication. Examples of the user terminal (not illustrated) may include a remote controller, a cellular phone, a personal digital assistant (PDA), and the like, but the present disclosure is not limited thereto, and examples thereof may include various other electronic devices that may be connected to the massage device 1000 through wired or wireless communication.

According to an embodiment of the present disclosure, a massage device may refer to a massage device including a body massage part and a leg massage part.

Also, according to another embodiment, a body massage part and a leg massage part may be present as separate devices (for example, a body massage device and a leg massage device), and a massage device may refer to the body massage device or the leg massage device.

Hereinafter, embodiments of the present disclosure will be described in more detail with reference to the accompanying drawings.

FIG. 1 is a view for describing the massage device 1000 according to an embodiment of the present disclosure.

The massage device 1000 according to an embodiment of the present disclosure may include a body massage part 100 that has an area formed to accommodate at least a portion of a user's body and is configured to massage the user's torso and a leg massage part 300 configured to massage the user's legs.

The body massage part 100 may provide massage to at least a portion of the user's body. The body massage part 100 may include a body massage module 104 configured to provide a massage function to at least a portion of the user's body, a sound output module 106 configured to provide an audio output in an arbitrary form to the user, a main frame 1100 constituting a framework of the body massage part 100, and a user input part 102 configured to receive an input in an arbitrary form from the user.

The above-described elements that the body massage part 100 includes are merely an exemplary embodiment, and the body massage part 100 may include various elements other than those described above.

Also, the shape and structure of the massage device 1000 illustrated in FIG. 1 are merely illustrative, and a massage device 1000 having various other forms may also fall within the scope of the present disclosure unless the form of the massage device 1000 deviates from the scope defined by the claims of the present disclosure.

The body massage part 100 may have a space formed in an arbitrary shape to accommodate a user. The body massage part 100 may have a space formed in a shape that corresponds to a shape of the user's body. For example, as illustrated in FIG. 1, the body massage part 100 may be implemented in the shape of a chair that may accommodate the entire body of the user or a portion of the body.

A portion of the body massage part 100 that comes in contact with the ground may include an arbitrary material configured to increase a frictional force or an arbitrary member configured to increase a frictional force (e.g., a nonslip pad etc.) and may include a wheel configured to reinforce the mobility of the massage device 1000.

The body massage part 100 may include a head contact part configured to come in contact with the user's head, a back contact part configured to come in contact with the user's back, a buttocks contact part configured to come in contact with the user's buttocks, and arm massage parts configured to accommodate the user's arms, but the present disclosure is not limited thereto, and the body massage part 100 may include user contact parts having various other forms.

Since the body massage part 100 may be reclined, the user may receive a massage while leaning backward.

Also, at least a portion of the body massage part 100 may be able to slide. For example, in the case in which the body massage part 100 begins to perform massage, at least a portion of the body massage part 100 may slide forward. Also, the body massage part 100 may be reclined. As a result, the body massage part 100 may provide a massage while the user is leaning backward.

The body massage part 100 may include a sensor part (not illustrated) including at least one sensor. Examples of the sensor may include a pressure sensor, an infrared sensor, a light-emitting diode (LED) sensor, and the like, but the present disclosure is not limited thereto. The body massage part 100 may sense a size of an area in contact with the user and/or a location of the area in contact with the user through sensors and may change locations and/or sizes of areas in contact with the user to fit the user's body shape. Also, the body massage part 100 may use information acquired through the sensor part and provide customized massage to the user.

For example, in the case in which the body massage part 100 provides shoulder massage, the body massage part 100 may recognize the user's shoulders on the basis of information acquired through the sensor part and provide shoulder massage to the user according to a result of recognition.

According to another embodiment of the present disclosure, the sensor part (not illustrated) may sense whether a user is seated. For example, the sensor part (not illustrated) may include a pressure sensor and sense, on the basis of a pressure applied to the pressure sensor, whether the user is seated. As another example, the sensor part (not illustrated) may include a touch sensor and, in the case in which a user's touch is sensed, the massage device 1000 may recognize that the user is seated.

Also, the sensor part (not illustrated) may sense whether a user is approaching the massage device 1000. For example, the sensor part (not illustrated) may include a distance sensor and measure a distance between the user and the massage device 1000.

According to an embodiment of the present disclosure, the massage device 1000 may include at least one air cell (not illustrated). The air cell may be located at portions of the massage device 1000 that correspond to the user's shoulders and pelvis, the arm massage parts, the leg massage part 300, and the like, but present disclosure is not limited thereto, and the air cell may be disposed at various other portions of the massage device 1000.

The massage device 1000 may include an air supply part. The air supply part may supply air to air cells according to control of a controller (not illustrated) and inflate the air cells. The air supply part may be located inside the body massage part 100 or located at the leg massage part 300. Also, the air supply part may be located outside the massage device 1000.

The body massage module 104 may be disposed inside the body massage part 100 to provide dynamic stimuli in arbitrary forms to a user accommodated in the body massage part 100. As illustrated in FIG. 1, the body massage module 104 may move along the main frame 1100 disposed inside the body massage part 100.

For example, a rail member 1151 may be disposed at the main frame 1100 of the body massage part 100, and the body massage module 104 may, while moving along the rail member 1151, provide dynamic stimuli to various parts of the user's body. The body massage module 104 may include a ball massage unit or a roller massage unit, but the present disclosure is not limited thereto.

The main frame 1100 constitutes a framework of an internal configuration of the body massage part 100 and may be implemented with a metal material, a plastic material, or the like. For example, the main frame 1100 may be implemented with iron, alloy, steel, and the like, but the present disclosure is not limited thereto, and the main frame 1100 may also be implemented with various other rigid materials.

The sound output module 106 may provide an audio output in an arbitrary form to the user. For example, the sound output module 106 may output a sound source and/or a binaural beat, which is optimized for a massage pattern provided from the massage device 1000, to the user and provide brain stimulation to the user. The sound output module 106 may output an acoustic signal which is received through a network (not illustrated) or stored in an internal/external storage medium (not illustrated). For example, through network connection (for example, Bluetooth connection etc.) with the user terminal (not illustrated), the sound output module 106 may output a sound source according to control of the user terminal (not illustrated). Also, the sound output module 106 may output an acoustic signal in an arbitrary form that is generated in relation to operation of the massage device 1000.

According to an embodiment of the present disclosure, the sound output module 106 may be disposed at various locations. For example, the sound output module 106 may include a plurality of output units such as an upper-end audio output unit disposed at an upper end of a seat part coming in contact with the user, a front audio output unit attached to front ends of the arm massage parts at the left and right sides of the seat part, and/or a rear audio output unit attached to rear ends of the arm massage parts, but the present disclosure is not limited thereto. In this case, the sound output module 106 may provide stereophonic sound such as 5.1 surround sound, but the present disclosure is not limited thereto.

The massage device 1000 may include the user input part 102 configured to receive a command related to operation control from the user, and the user input part 102 may be implemented in various forms. For example, the user input part 102 may be in the form of a user input module (e.g., a remote controller, etc.) and disposed in the massage device 1000. Also, the user input part 102 may be integrally formed with the body massage part 100 or integrally formed with the leg massage part 300, but the present disclosure is not limited thereto.

The massage device 1000 may acquire various commands from the user through the user input part 102. For example, the massage device 1000 may receive an arbitrary command relating to selection of massage module, selection of massage type, selection of massage intensity, selection of massage time, selection of massage site, selection relating to location and operation of the body massage part 100, selection relating to on-off of power of the massage device 1000, selection relating to whether to use warming function, selection relating to sound source playback, and the like, but the present disclosure is not limited thereto.

According to another embodiment of the present disclosure, the user input part 102 may have, according to a function preset by the user, a function preset by itself, or the like, hot key buttons, and/or selection buttons for executing direction selection, cancellation, and input.

The user input part 102 may be implemented with a key pad, a dome switch, a touch pad (static pressure/capacitive), a jog wheel, a jog switch, and the like, but the present disclosure is not limited thereto. Also, the user input part 102 may acquire a command through the user's speech on the basis of a voice recognition technology.

According to an embodiment of the present disclosure, the user input part 102 may include a display configured to display an operation status of the massage device 1000, the current condition of the user, or the like. In this case, the display may be at least one of a liquid crystal display (LCD), a thin film transistor-liquid crystal display (TFT LCD), an organic light-emitting diode (OLED) display, a flexible display, and a 3D display, but the present disclosure is not limited thereto.

According to an embodiment of the present disclosure, the massage device 1000 may include the controller (not illustrated). The controller (not illustrated) may be implemented with a single processor or implemented with a plurality of processors, but the present disclosure is not limited thereto.

The massage device 1000 according to an embodiment of the present disclosure may include a network connection part (not illustrated). The network connection part (not illustrated) may perform communication with a module inside the massage device 1000, an external massage device, and/or a user terminal 2000 through a network in an arbitrary form. The network connection part (not illustrated) may include a wired/wireless connection module for network connection. For example, as a wireless connection technology, wireless LAN (WLAN) (Wi-Fi), wireless broadband (WiBro), World Interoperability for Microwave Access (WiMax), High Speed Downlink Packet Access (HSDPA), and the like may be used. For example, as a wired connection technology, x Digital Subscriber Line (xDSL), Fiber to the Home (FTTH), Power Line Communication (PLC), and the like may be used. Also, the network connection part may include a short-range communication module and transmit and receive data to and from an arbitrary device/terminal located at a short distance. For example, as a short-range communication technology, Bluetooth, Radio Frequency Identification (RFID), Infrared Data Association (IrDA), Ultra Wideband (UWB), ZigBee, and the like may be used, but the present disclosure is not limited thereto.

Figure 2:
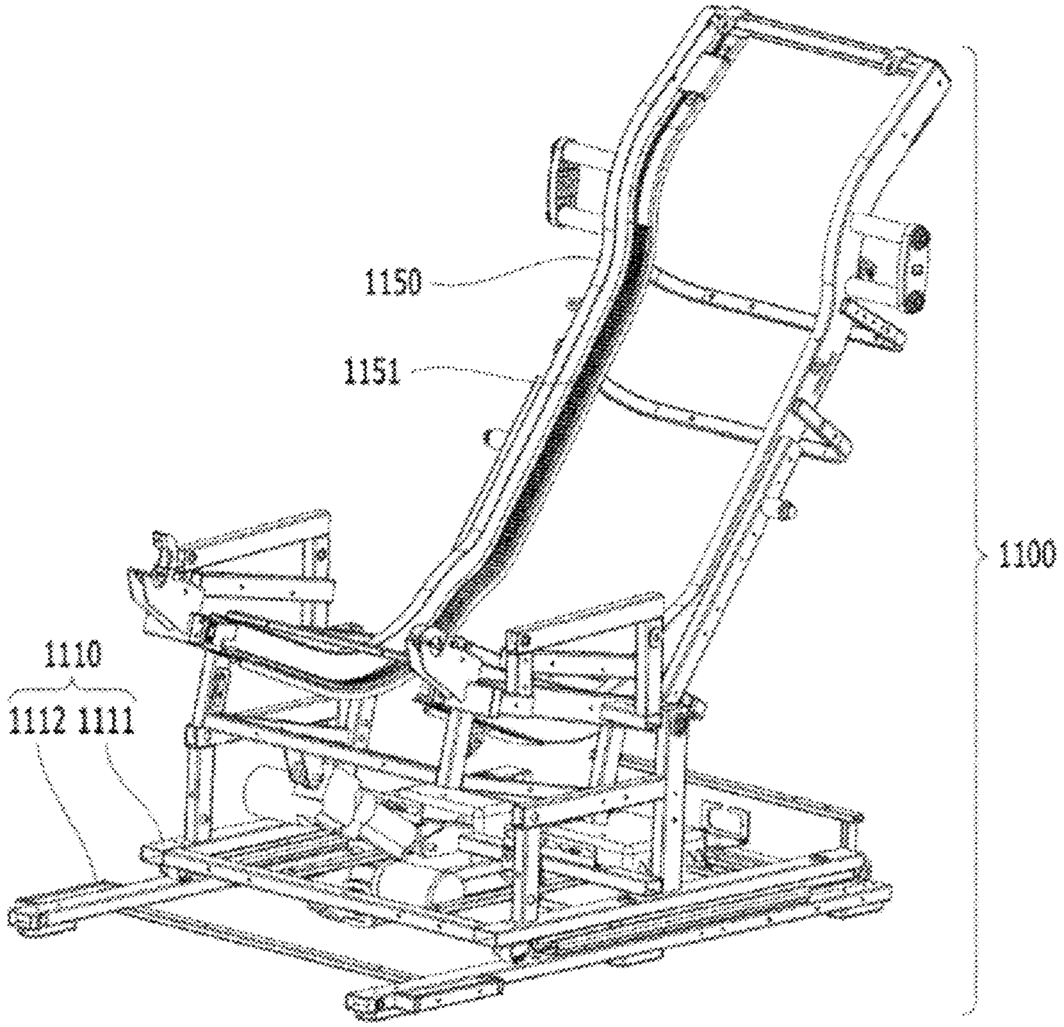
FIG. 2 is a view for describing a main frame according to an embodiment of the present disclosure.

FIG. 2 is a view for describing the main frame according to an embodiment of the present disclosure.

According to an embodiment of the present disclosure, the main frame 1100 may include an upper frame 1150 at which the body massage module 104 is disposed and a base frame 1110 configured to support the upper frame 1150.

The rail member 1151 may be disposed on at least a portion of the upper frame 1150. The rail member 1151 is a member configured to guide vertical movement of the body massage module 104 and may include a plurality of valley portions and a plurality of ridge portions.

According to an embodiment of the present disclosure, the rail member 1151 may be disposed to face both side portions of the upper frame 1150, and the body massage module 104 may move along the rail member 1151.

For example, the body massage module 104 may include a gear engaged with the rail member 1151, and as the gear rotates due to an actuator disposed in the body massage module 104, the body massage module 104 may move upward or downward.

The rail member 1151 may be implemented with a metal material or a plastic material. For example, the rail member 1151 may be implemented with iron, steel, alloy, reinforced plastic, melamine resin, phenol resin, and the like, but the present disclosure is not limited thereto.

The upper frame 1150 may be implemented in various shapes. For example, the upper frame 1150 may be classified as an S-frame, an L-frame, an S&L frame, or a double S&L frame according to its shape, but the present disclosure is not limited thereto.

The S-frame refers to the upper frame 1150 in which at least a portion is curved in an S-like shape. The L-frame refers to the upper frame 1150 in which at least a portion is bent in an L-like shape, the S&L frame refers to a frame that includes both a portion curved in an S-like shape and a portion bent in an L-like shape, and the double S&L frame refers to a frame that includes a portion bent in an L-like shape and two portions curved in an S-like shape.

The base frame 1110 refers to a portion of the main frame 1100 that supports the upper frame 1150 and comes in contact with the ground. The base frame 1110 may include a base upper frame 1111 and a base lower frame 1112.

The base upper frame 1111 may support the upper frame 1150, and the base lower frame 1112 may come in contact with the ground. Also, the base upper frame 1111 may be located so as to come in contact with the base lower frame 1112.

According to an embodiment of the present disclosure, the base upper frame 1111 may move along the base lower frame 1112. For example, the base upper frame 1111 may slide forward or rearward along the base lower frame 1112. In this case, the upper frame 1150 may be connected to the base upper frame 1111 and move according to movement of the base upper frame 1111.

For example, in the case in which the base upper frame 1111 moves forward, the upper frame 1150 may also move forward, and in the case in which the base upper frame 1111 moves rearward, the upper frame 1150 may also move rearward. Thus, sliding of the body massage part 100 may be allowed.

Specifically, in order to allow movement of the base upper frame 1111, a moving wheel may be disposed at a lower portion of the base upper frame 1111. Also, a guide member configured to guide the moving wheel may be disposed at an upper portion of the base lower frame 1112. The moving wheel disposed at the base upper frame 1111 may move along the guide member disposed at the base lower frame 1112 so that forward movement or rearward movement of the base upper frame 1111 is allowed.

According to another embodiment of the present disclosure, the massage device 1000 may not provide a sliding function and, in this case, the base frame 1110 may not be separated into upper and lower frames.

Figure 3:
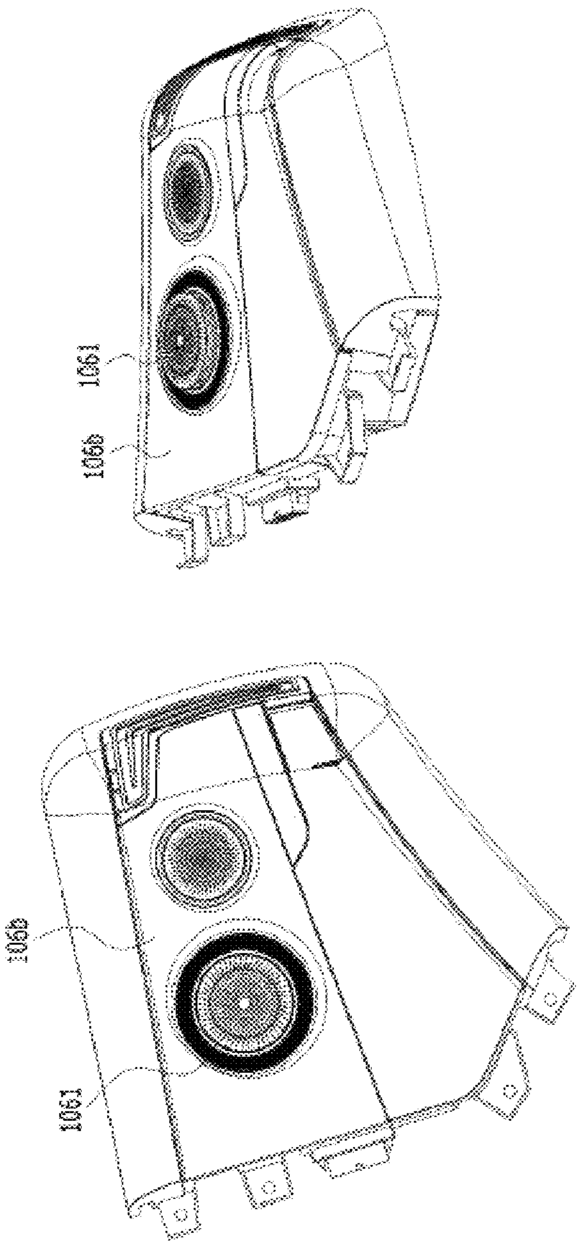
FIG. 3 is a view for describing a form in which at least a portion of a sound output module protrudes outward according to an embodiment of the present disclosure.

FIG. 3 is a view for describing a form in which at least a portion of the sound output module protrudes outward according to an embodiment of the present disclosure.

According to an embodiment of the present disclosure, the massage device 1000 may include a plurality of sound output modules 106.

The sound output module 106 may include an external housing **106*b* constituting an outer surface of the sound output module. The external housing 106*b* may be implemented with a rigid material. For example, the external housing 106*b*** may be made of plastic, reinforced plastic, iron, metal, and the like, but the present disclosure is not limited thereto.

Elements of the sound output module 106 may be disposed inside the external housing **106*b*. For example, a sound generating part 106*a* may be disposed in a space present inside the external housing 106*b***.

The sound generating part **106*a* may generate sound, and the sound generated from the sound generating part 106*a* may be emitted to the outside of the massage device 1000 through a sound emitting member 1061. The sound emitting member 1061 may include at least one hole and pass the sound generated from the sound generating part 106***a* through the hole.

Also, the sound emitting member 1061 may move linearly. For example, the sound emitting member 1061 may protrude while rotating in a direction toward the outside of the massage device 1000 or may move while rotating in a direction toward the inside of the massage device. The structure of the sound output module 106 that allows movement of the sound emitting member 1061 will be described below with reference to FIG. 4.

Figure 4:
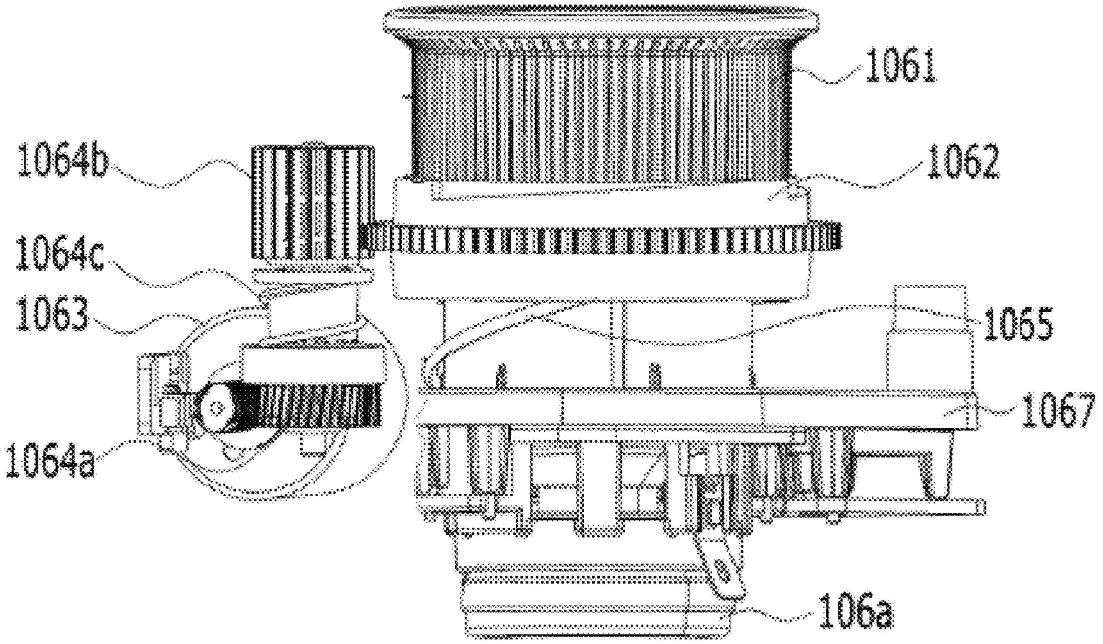
FIG. 4 is a view for describing a structure of a sound output module (106) that allows protrusion of a sound emitting member (1061) according to an embodiment of the present disclosure.

FIG. 4 is a view for describing the structure of the sound output module 106 that allows protrusion of the sound emitting member 1061 according to an embodiment of the present disclosure.

According to an embodiment of the present disclosure, the sound output module 106 may include at least one of an actuator 1063, a first worm gear 1064*a*, an elastic member 1064*c*, a second worm gear 1064*b*, an external driven member 1062, an impact absorbing member 1065, the sound emitting member 1061, and an internal fixed housing 1067.

The actuator 1063 may provide a driving force to allow movement of the sound emitting member 1061.

In the case in which the actuator 1063 provides the driving force, the first worm gear 1064*a* engaged with the actuator 1063 may rotate. In the case in which the first worm gear 1064*a* rotates, the second worm gear 1064*b* connected to the first worm gear 1064*a* may also rotate. The elastic member 1064*c* may be disposed between the first worm gear 1064*a* and the second worm gear 1064*b*. The elastic member 1064*c* will be described below with reference to FIG. 9.

The external driven member 1062 may include a gear engaged with the second worm gear 1064*b*. For example, a gear engaged with the second worm gear 1064*b* may be disposed on an outer circumferential surface of the external driven member 1062. According to an embodiment, in the case in which the second worm gear 1064*b* rotates due to the driving force transmitted from the actuator 1063, the external driven member 1062 engaged with the second worm gear 1064*b* may also rotate.

The rotation of the external driven member 1062 may cause the external driven member 1062 to move linearly due to an internal driven member 1066. For example, the external driven member 1062 may move in the direction toward the outside of the massage device 1000. An interaction between the internal driven member 1066 and the external driven member 1062 will be described in detail below with reference to FIGS. 5 to 7.

In this case, since the internal driven member 1066 is in contact with the internal fixed housing 1067 and the external driven member 1062 is in contact with the internal driven member 1066, the external driven member 1062 may move in the direction toward the outside of the massage device 1000 along the internal fixed housing 1067. At least a portion of the internal fixed housing 1067 may be formed in a cylindrical shape having a space therein, and thus the sound generated from the sound generating part may be transmitted to the sound emitting member 1061 through the inside of the internal fixed housing 1067. The internal fixed housing 1067 may be implemented with a rigid material. For example, the internal fixed housing 1067 may be implemented with plastic, reinforced plastic, aluminum, iron, metal, and the like, but the present disclosure is not limited thereto.

The sound emitting member 1061 may be seated on the external driven member 1062. For example, at least one protrusion may be disposed on at least a portion of an outer circumferential surface of the external driven member 1062, and at least one groove may be disposed in the sound emitting member 1061. Thus, the sound emitting member 1061 may be fitted and coupled to the external driven member 1062.

The sound emitting member 1061 may be implemented with various materials. For example, the sound emitting member 1061 may be implemented with plastic, reinforced plastic, iron, metal, and the like, but the present disclosure is not limited thereto.

The sound emitting member 1061 may be seated on the external driven member 1062 and protrude outward according to the linear movement of the external driven member 1062. For example, in the case in which the external driven member 1062 moves linearly in the direction toward the outside of the massage device 1000, the sound emitting member 1061 may protrude to the outside of the massage device 1000. Also, in the case in which the external driven member 1062 moves linearly in the direction toward the inside of the massage device 1000, the sound emitting member 1061 may move linearly in the direction toward the inside of the massage device 1000.

Figure 5:
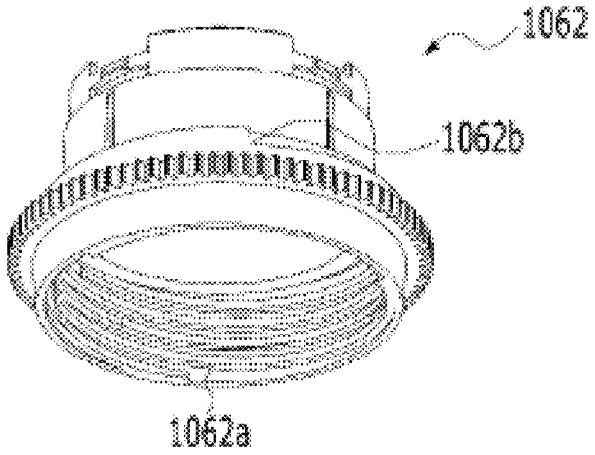
FIG. 5 is a view for describing an external driven member (1062) according to an embodiment of the present disclosure.

FIG. 5 is a view for describing the external driven member 1062 according to an embodiment of the present disclosure.

According to an embodiment of the present disclosure, the sound output module 106 may include the external driven member 1062. Referring to FIG. 5, the external driven member 1062 may be formed in a cylindrical shape having a space therein, but the present disclosure is not limited thereto.

The external driven member 1062 may receive the driving force from the second worm gear 1064*b*. For example, a gear engaged with the second worm gear 1064*b* may be disposed on the outer circumferential surface of the external driven member 1062, and thus the external driven member 1062 may receive a rotary force from the second worm gear 1064*b*.

The external driven member 1062 may include a screw groove 1062*a* formed in at least a portion of an inner circumferential surface thereof. For example, the screw groove 1062*a* may be disposed at a lower portion of the inner circumferential surface of the external driven member 1062.

The screw groove 1062*a* in the inner circumferential surface of the external driven member 1062 may be engaged with at least one protrusion disposed on an outer circumferential surface of the internal driven member 1066 and, in the case in which the external driven member 1062 rotates, the external driven member 1062 may move linearly in the direction toward the outside of the massage device 1000.

According to an embodiment of the present disclosure, at least one stepped portion may be disposed on the outer circumferential surface of the external driven member 1062. Also, at least one groove 1062*b* may be disposed in the stepped portion that is disposed on the outer circumferential surface of the external driven member 1062.

The groove 1062*b* disposed in the outer circumferential surface of the external driven member 1062 may be engaged with a protrusion 106*c* disposed on the inner surface of the external housing 106*b* and thus block rotation of the external driven member 1062. As a result, the linear movement of the external driven member 1062 may also be stopped.

For example, in the case in which the external driven member 1062 has moved a predetermined distance linearly, there is a need to stop the external driven member 1062. In this case, although the external driven member 1062 stops as the actuator 1063 stops first, detailed control of the external driven member 1062 may not be performed. Therefore, in order to allow the external driven member 1062 to accurately stop at a predetermined location, the protrusion **106*c* disposed on the inner surface of the external housing 106*b* and the groove 1062*b* disposed in the outer circumferential surface of the external driven member 1062** may be present.

Since the protrusion **106*c* disposed on the inner surface of the external housing 106*b* is engaged with the groove 1062*b* disposed in the outer circumferential surface of the external driven member 1062, the external driven member 1062** may accurately stop at the predetermined position.

In this case, at least one surface of the groove **1062*b* disposed in the external driven member 1062 may be implemented to be inclined in a horizontal direction. Since the at least one surface of the groove 1062*b* disposed in the external driven member 1062 is inclined in the horizontal direction, the external driven member 1062 may rotate and move linearly, and the groove 1062*b* may be engaged with the protrusion 106*c***.

Figure 6:
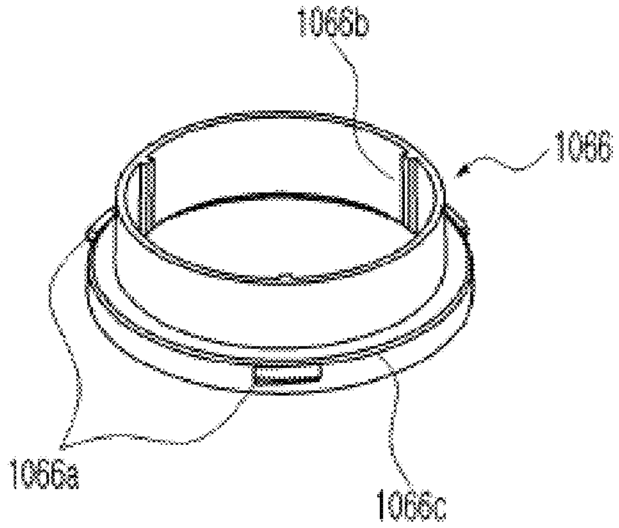
FIG. 6 is a view for describing an internal driven member (1066) according to an embodiment of the present disclosure.

FIG. 6 is a view for describing the internal driven member 1066 according to an embodiment of the present disclosure.

According to an embodiment of the present disclosure, the sound output module 106 may include the internal driven member 1066. The internal driven member 1066 may be implemented in a cylindrical shape having a space therein, but the present disclosure is not limited thereto.

According to an embodiment of the present disclosure, at least one stepped portion **1066*c* may be formed on the outer circumferential surface of the internal driven member 1066. Also, at least one protrusion 1066*a* may be formed on the outer circumferential surface of the internal driven member 1066**.

The protrusion **1066*a* disposed on the outer circumferential surface of the internal driven member 1066 may be engaged with the screw groove 1062*a* disposed in the inner surface of the external driven member 1062** and may be implemented to be tilted in a longitudinal direction.

Thus, in the case in which the external driven member 1062 rotates in a first direction, the screw groove **1062*a* disposed in the inner circumferential surface of the external driven member 1062 and the at least one protrusion 1066*a* disposed on the outer circumferential surface of the internal driven member 1066 may interact, and the external driven member 1062 may move linearly in a direction toward the outside of the sound output module 106. As a result, the sound emitting member 1061 seated on the external driven member 1062 may protrude to the outside of the massage device 1000**.

Also, in the case in which the external driven member 1062 rotates in a second direction, the screw groove **1062*a* disposed in the inner circumferential surface of the external driven member 1062 and the at least one protrusion 1066*a* disposed on the outer circumferential surface of the internal driven member 1066 may interact, and the external driven member 1062 may move linearly in a direction toward the inside of the sound output module 106. As a result, the sound emitting member 1061 seated on the external driven member 1062 may move in the direction toward the inside of the massage device 1000**.

At least one protrusion **1066*b* may be formed on at least a portion of an inner circumferential surface of the internal driven member 1066. For example, the at least one protrusion 1066*b* may be formed in the longitudinal direction on at least a portion of the inner circumferential surface of the internal driven member 1066**.

The protrusion **1066*b* that is formed in the longitudinal direction on the inner circumferential surface may be fitted and coupled to a groove disposed in an outer surface of the internal fixed housing 1067. As a result, even when the external driven member 1062 rotates, rotation of the internal driven member 1066 may be prevented, and linear movement of the internal driven member 1066** may be allowed.

Figure 7:
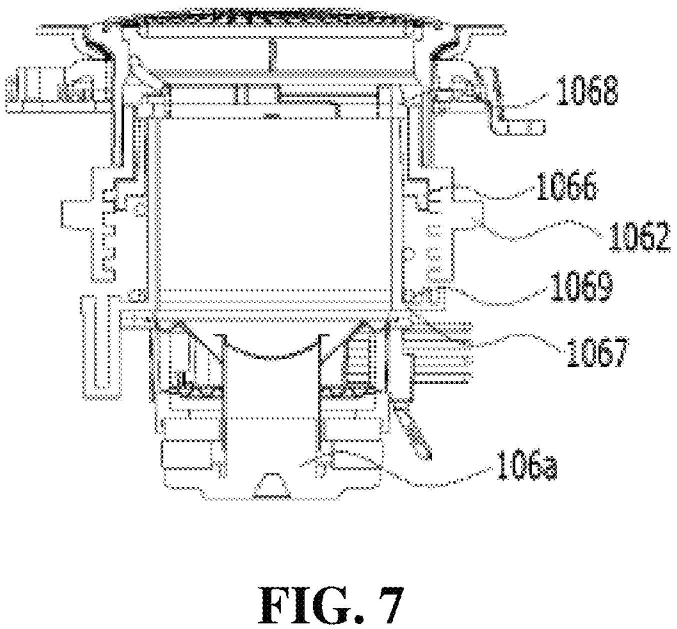
FIG. 7 is a view for describing an internal structure of the sound output module according to an embodiment of the present disclosure.

FIG. 7 is a view for describing an internal structure of the sound output module according to an embodiment of the present disclosure.

According to an embodiment of the present disclosure, the sound generating part **106*a* may be connected to the internal fixed housing 1067**.

The sound generated from the sound generating part **106*a* may be transmitted through the space inside the internal fixed housing 1067 and output to the outside through the sound emitting member 1061**.

At least a portion of the internal fixed housing 1067 may be implemented as a cylindrical structure. Since at least a portion of the internal driven member 1066 may also be implemented as a cylindrical structure, at least a portion of the internal driven member 1066 may be formed to surround at least a portion of the internal fixed housing 1067.

Also, a lower portion of the internal fixed housing 1067 may be implemented in the shape of a plate extending in the horizontal direction, and the impact absorbing member 1065 may be disposed between the portion extending in the horizontal direction and the internal driven member 1066.

The impact absorbing member 1065 may be implemented as an elastic member so that, in the case in which the internal driven member 1066 receives force in a direction toward the sound generating part **106*a*, the impact absorbing member 1065 may absorb the force. For example, the impact absorbing member 1065 may be implemented with a spring, a leaf spring, or the like, but the present disclosure is not limited thereto, and the impact absorbing member 1065** may be implemented with various other members that have elasticity.

Specifically, in the case in which the sound emitting member 1061 protrudes to the outside, as the user collides with or presses the sound emitting member 1061, force in the direction toward the inside of the massage device 1000 may be applied to the sound emitting member 1061.

In this case, the applied force may be applied to the external driven member 1062, and the force applied to the external driven member 1062 may be applied to the internal driven member 1066. The force applied to the internal driven member 1066 may be applied to the impact absorbing member 1065, and the impact absorbing member 1065 may contract and absorb the applied force. As a result, in the case in which the sound emitting member 1061 protrudes to the outside, the elements inside the sound output module 106 may not be damaged even when the elements receive a pressing force from the outside.

According to an embodiment of the present disclosure, a detachment preventing member 1068 may be disposed at one end of the internal fixed housing 1067. The detachment preventing member 1068 may form a stepped portion at one end of the internal fixed housing 1067 to prevent the internal driven member 1066 from being detached from the internal fixed housing 1067.

Figure 8:
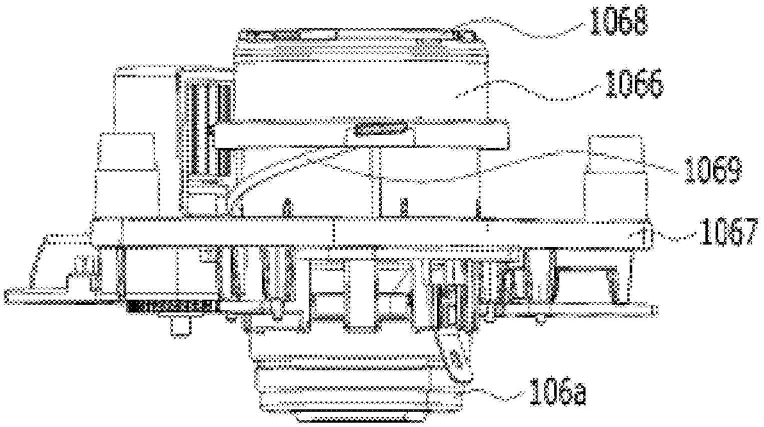
FIG. 8 is a view for describing a structure between an internal driven member and a detachment preventing member according to an embodiment of the present disclosure.

FIG. 8 is a view for describing a structure between the internal driven member and the detachment preventing member according to an embodiment of the present disclosure.

As illustrated in FIG. 8, due to the impact absorbing member 1065, the internal driven member 1066 may receive a force in a direction opposite to the direction toward the sound generating part 106*a*. In this case, since the internal driven member 1066 may be detached from the internal fixed housing 1067, the detachment preventing member 1068 may be disposed at one end of the internal fixed housing 1067 in order to prevent detachment of the internal driven member 1066.

Figure 9:
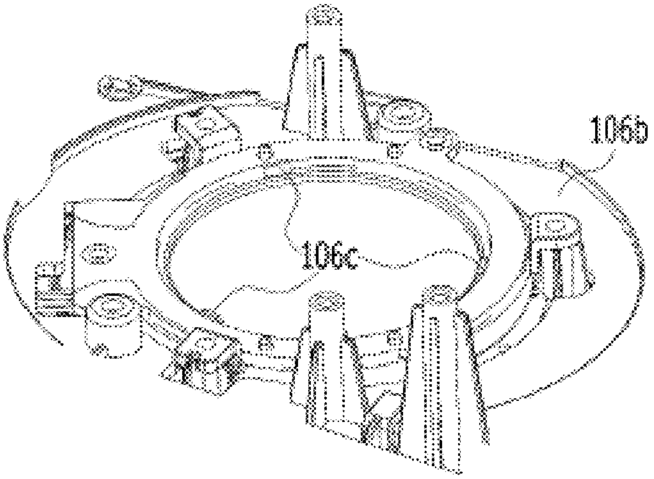
FIG. 9 is a view for describing a structure of an inner surface of an external housing (106*b*) according to an embodiment of the present disclosure.

FIG. 9 is a view for describing the structure of the inner surface of the external housing 106*b* according to an embodiment of the present disclosure.

According to an embodiment of the present disclosure, at least one protrusion 106*c* may be formed on the inner surface of the external housing 106*b*.

The at least one protrusion 106*c* may be engaged with the at least one groove 1062*b* formed in the outer circumferential surface of the external driven member 1062 and prevent over-rotation of the external driven member 1062.

As a result, since the external driven member 1062 may rotate by as much as a predetermined degree, the external driven member 1062 may move linearly by as much as a predetermined degree, and the sound emitting member 1061 seated on the external driven member 1062 may protrude to the outside by as much as a predetermined length.

Figure 10:
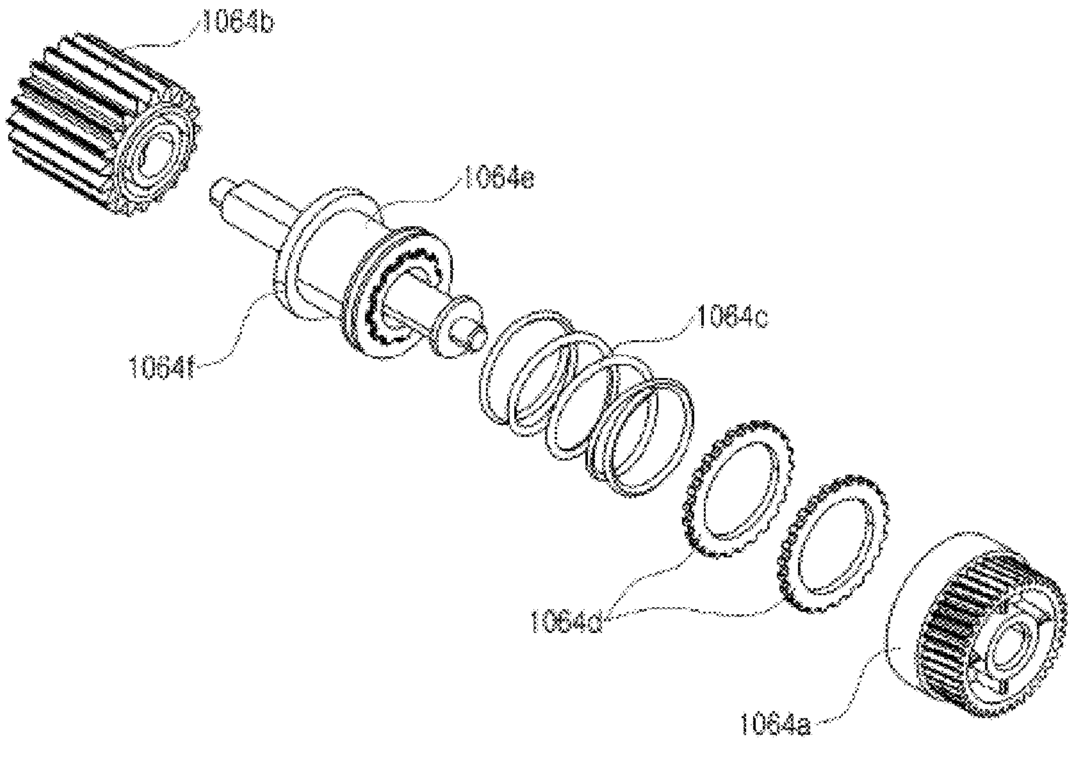
FIG. 10 is a view for describing an elastic member according to an embodiment of the present disclosure.

FIG. 10 is a view for describing the elastic member according to an embodiment of the present disclosure.

According to an embodiment of the present disclosure, at least one connection gear 1064*d* may be disposed inside the first worm gear 1064*a*, and the at least one connection gear 1064*d* may be connected to a gear link arm 1064*e*.

A gear engaged with the first worm gear 1064*a* may be disposed on an outer circumferential surface of the connection gear 1064*d*, and a gear engaged with the connection gear 1064*d* may be disposed on an inner circumferential surface of the first worm gear 1064*a*. Thus, rotation of the first worm gear 1064*a* may be transmitted to the connection gear 1064*d*.

The at least one connection gear 1064*d* may have an outer side coming in contact with the first worm gear 1064*a* and an inner side coming in contact with the gear link arm 1064*e*, and thus a rotary force transmitted from the first worm gear 1064*a* may be transmitted to the gear link arm 1064*e*.

For example, since the inner circumferential surface of the at least one connection gear 1064*d* may be attached to the gear link arm 1064*e*, the at least one connection gear 1064*d* may transmit the rotation transmitted from the first worm gear 1064*a* to the gear link arm 1064*e*. Also, since the gear engaged with the gear disposed on the gear link arm 1064*e* may be disposed on the inner circumferential surface of the at least one connection gear 1064*d*, the at least one connection gear 1064*d* may transmit the rotary force transmitted from the first worm gear 1064*a* to the gear link arm 1064*e*.

The gear link arm 1064*e* may transmit the rotary force applied to the gear link arm 1064*e* to the second worm gear 1064*b*.

For example, the other end of the gear link arm 1064*e* may be implemented as a polygonal pillar, and the inside of the second worm gear 1064*d* may include a polygonal hole that corresponds to the polygonal pillar of the other end of the gear link arm 1064*e*. In this case, the other end of the gear link arm 1064*e* may be embedded inside the second worm gear 1064*d*, and the second worm gear 1064*d* may also rotate due to rotation of the gear link arm 1064*e*.

At least one protrusion 1064*f* may be disposed on a portion of the gear link arm 10643, and the elastic member 1064*c* may be located between a lower surface of the protrusion 1064*f* and the first worm gear 1064*a*.

The elastic member 1064*c* may absorb at least a portion of the force applied to the second worm gear 1064*b*. The elastic member 1064*c* may be implemented with a spring, a leaf spring, or the like, but the present disclosure is not limited thereto.

According to an embodiment of the present disclosure, in the case in which rotation of the external driven member 1062 is stopped by the at least one protrusion 106*c* present on the inner surface of the external housing 106*b*, a force may be applied to the second worm gear 1064*b* that is engaged with the gear disposed on the outer circumferential surface of the external driven member 1062. The force applied to the second worm gear 1064*b* may be absorbed by the elastic member 1064*c* located between the first worm gear 1064*a* and the second worm gear 1064*b*.

In the case in which the applied force is transmitted to the actuator 1063, since there is a possibility that a problem may occur in the actuator 1063, the service life of the actuator 1063 may be increased due to the elastic member 1064*c* located between the first worm gear 1064*a* and the second worm gear 1064*b*.

Figure 11:
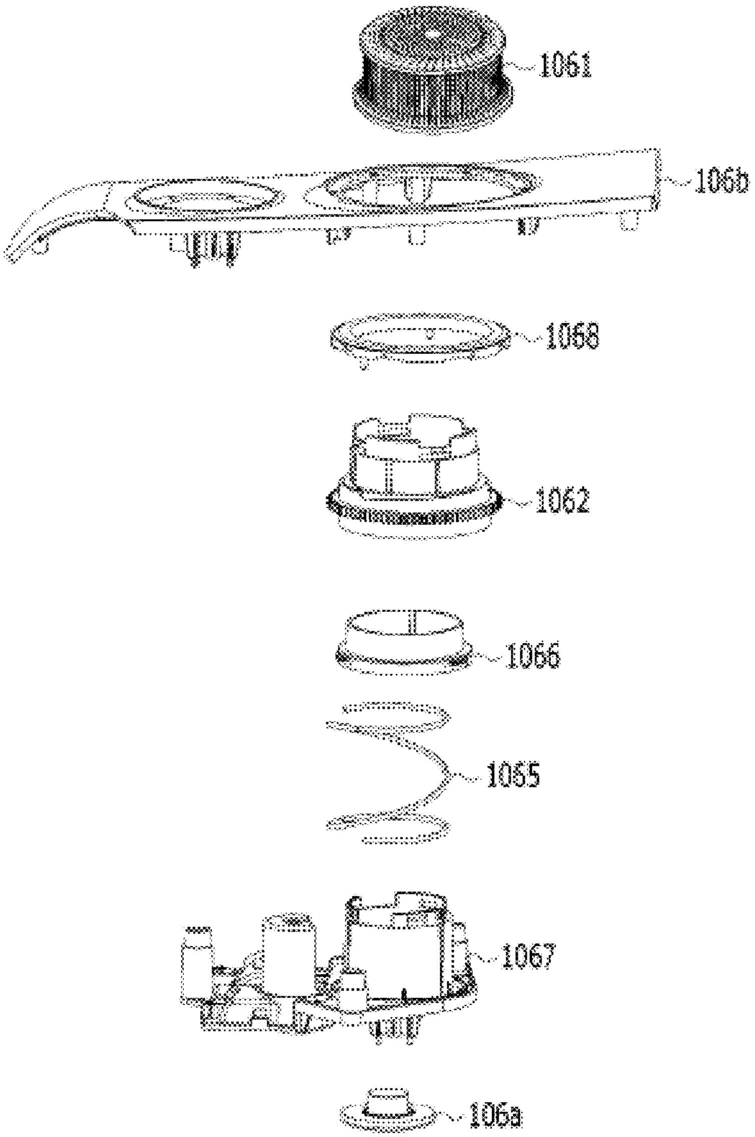
FIG. 11 is a development view for describing elements of the sound output module according to an embodiment of the present disclosure.

FIG. 11 is a development view for describing the elements of the sound output module according to an embodiment of the present disclosure.

According to an embodiment of the present disclosure, the sound generating part 106*a* may generate sound. For example, the sound generating part 106*a* may output music, voice guidance, and the like, but the present disclosure is not limited thereto, and the sound generating part 106*a* may generate various other sounds.

The sound generated by the sound generating part 106*a* may be transmitted through the space disposed inside the internal fixed housing 1067. The internal driven member 1066 may be located outside the internal fixed housing 1067, and the external driven member 1062 may be located outside the internal driven member 1066.

The external driven member 1062 may rotate by the driving force transmitted from the actuator 1063. In the case in which the external driven member 1062 rotates, the external driven member 1062 may move linearly due to the interaction between the external driven member 1062 and the internal driven member 1066.

For example, the screw groove 1062*a* disposed in the inner circumferential surface of the external driven member 1062 and the at least one protrusion disposed on the inner circumferential surface of the external driven member 1062 may interact, and the external driven member 1062 may move in a direction toward the external housing 106*b*.

The sound emitting member 1061 may be seated on an upper portion of the external driven member 1062, and due to linear movement of the external driven member 1062, the sound emitting member 1061 may also move linearly. As a result, the sound emitting member 1061 may protrude to the outside of the massage device 1000.

Also, the impact absorbing member 1065 may be disposed between the internal driven member 1066 and at least a portion of the internal fixed housing 1067, and the impact absorbing member 1065 may absorb a force applied from the outside.

According to another embodiment of the present disclosure, the massage device 1000 may control the sound output module 106 on the basis of information acquired by the sensor part (not illustrated).

For example, the massage device 1000 may acquire information on whether a user is seated, and the massage device 1000 may control the sound output module 106 on the basis of the information on whether the user is seated.

For example, in the case in which the user is seated on the massage device 1000, the massage device 1000 may operate the actuator 1063 to cause the sound emitting member 1061 to protrude to the outside of the massage device 1000. Also, in the case in which the user leaves the massage device 1000, the massage device 1000 may operate the actuator 1063 to cause the protruding sound emitting member 1061 to be embedded inside the massage device 1000.

As another example, the massage device 1000 may control the sound output module 106 on the basis of a distance between the massage device 1000 and the user. For example, in the case in which the distance between the user and the massage device 1000 is equal to or less than (or less than) a predetermined distance, the massage device 1000 may operate the actuator 1063 to cause the sound emitting member 1061 to protrude to the outside of the massage device 1000. Also, in the case in which the distance between the user and the massage device 1000 is greater than or equal to (or greater than) a predetermined distance, the massage device 1000 may operate the actuator 1063 to cause the protruding sound emitting member 1061 to be embedded inside the massage device 1000.

Also, the massage device 1000 may adjust a volume of sound output by the sound output module 106 on the basis of the distance between the massage device 1000 and the user. For example, in the case in which the user approaches the massage device 1000, the massage device 1000 may reduce the volume of sound output by the sound output module 106. Also, in the case in which the user moves away from the massage device 1000, the massage device 1000 may increase the volume of sound output by the sound output module 106.

Description of the proposed embodiments has been provided above to allow any of ordinary skill in the art to use or embody the present invention. It should be apparent to those of ordinary skill in the art that various modifications may be made to the embodiments, and general principles defined herein may be applied to other embodiments without departing from the scope of the present invention. Therefore, the present invention is not limited to the embodiments proposed herein and should be interpreted as having the broadest possible range that is consistent with the principles and novel features proposed herein

The invention claimed is:

1. A sound output module comprising:

a sound generator configured to generate sound;

a sound emitter configured to emit the sound to outside;

an actuator configured to provide a driving force to allow movement of the sound emitter;

an external driver configured to receive the driving force from the actuator and move linearly, wherein the sound emitter is seated on the external driver and allowed to protrude due to linear movement of the external driver;

an internal fixed housing configured to transmit the sound through a space therein; and an internal driver located to come in contact with an outer circumferential surface of at least a first portion of the internal fixed housing.

2. The sound output module of claim 1, wherein a screw groove is disposed in an inner circumferential surface of the external driver.

3. The sound output module of claim 2, further comprising the internal driver located inside the external driver and having at least one protrusion engaged with the screw groove disposed in the inner circumferential surface of the external driver, wherein the external driver rotates due to a rotary force received from the actuator, and through the screw groove disposed in the inner circumferential surface of the external driver and the at least one protrusion engaged with the screw groove that is disposed on an outer circumferential surface of the internal driver, the rotation causes the external driver to move linearly.

4. The sound output module of claim 1, further comprising:

a first worm gear engaged with the actuator; and a second worm gear connected to the first worm gear and engaged with the external driver, wherein an elastic member is disposed between the first worm gear and the second worm gear.

5. The sound output module of claim 1, further comprising:

an impact absorber disposed between at least a second portion of the internal fixed housing and the internal driver to absorb a force applied from the outside.

6. The sound output module of claim 1, further comprising an external housing constituting an outer surface of the sound output module.

7. The sound output module of claim 6, wherein at least one protrusion configured to block rotation of the external driver is disposed on at least a portion of an inner surface of the external housing.

8. The sound output module of claim 7, wherein at least one stepped portion is disposed on an outer circumferential surface of the external driver.

9. The sound output module of claim 8, wherein at least one groove is disposed in one of the at least one stepped portion; and the at least one groove is engaged with the at least one protrusion and blocks the rotation of the external driver.

10. The sound output module of claim 1, further comprising a detachment preventing member configured to prevent detachment of the internal driver.

11. A massage device comprising:

a main frame constituting a framework of the massage device;

a body massage assembly coming in contact with the main frame and configured to provide dynamic stimuli to a user; and a sound output module configured to output sound to the user, wherein the sound output module includes a sound generator configured to generate sound, a sound emitter configured to emit transmitted sound to outside, an actuator configured to provide a driving force to allow movement of the sound emitter, an external driver configured to receive the driving force from the actuator and move linearly, and an internal fixed housing configured to transmit the sound generated from the sound generator through a space therein, the sound emitter is seated on the external driver and allowed to protrude due to linear movement of the external driver and, an internal driver is located to come in contact with an outer circumferential surface of at least a portion of the internal fixed housing.

* * * * *